(12) United States Patent
Tsukidate et al.

(10) Patent No.: US 9,903,389 B2
(45) Date of Patent: Feb. 27, 2018

(54) AXIAL-FLOW COMPRESSOR AND MODIFICATION METHOD

(75) Inventors: Hironori Tsukidate, Hitachi (JP); Hidetoshi Kuroki, Hitachi (JP); Atsushi Sano, Hitachinaka (JP)

(73) Assignee: Mitsubishi Hitachi Power Systems, Ltd., Yokohama (JP)

(*) Notice: Subject to any disclaimer, the term of this patent is extended or adjusted under 35 U.S.C. 154(b) by 381 days.

(21) Appl. No.: 13/367,436

(22) Filed: Feb. 7, 2012

(65) Prior Publication Data

US 2012/0230813 A1    Sep. 13, 2012

(30) Foreign Application Priority Data

Mar. 7, 2011 (JP) .................................. 2011-048566

(51) Int. Cl.
F04D 29/56 (2006.01)
F02C 9/20 (2006.01)
F01D 17/16 (2006.01)

(52) U.S. Cl.
CPC ......... F04D 29/563 (2013.01); F01D 17/162 (2013.01); F02C 9/20 (2013.01); F05D 2230/80 (2013.01); F05D 2270/62 (2013.01); Y10T 29/49229 (2015.01)

(58) Field of Classification Search
CPC ......... F01D 17/162; F02C 9/20; F04D 29/563
USPC .......................... 415/160, 162, 199.1, 199.5
See application file for complete search history.

(56) References Cited

U.S. PATENT DOCUMENTS

| 2,862,654 A * | 12/1958 | Gardiner | ............... | F01D 17/162 |
| | | | | 415/147 |
| 3,487,992 A * | 1/1970 | Pineda | .................. | F01D 17/162 |
| | | | | 415/149.4 |
| 4,618,311 A * | 10/1986 | Miura | .................. | F01D 17/162 |
| | | | | 415/150 |
| 6,457,937 B1 * | 10/2002 | Mashey | ................ | F01D 17/162 |
| | | | | 415/150 |

(Continued)

FOREIGN PATENT DOCUMENTS

JP 59-7708 A 1/1984
JP 61-252899 A 11/1986

(Continued)

OTHER PUBLICATIONS

Japanese Office Action dated Jan. 29, 2013 (four (4) pages).

*Primary Examiner* — Igor Kershteyn
*Assistant Examiner* — Brian P Wolcott
(74) *Attorney, Agent, or Firm* — Crowell & Moring LLP

(57) ABSTRACT

An axial-flow compressor with variable stator vanes located at a single stage can be modified by adding variable stator vanes to the axial-flow compressor so that the variable stator vanes are located at a plurality of stages. The axial-flow compressor includes stator vane rows located at the plurality of stages and include the variable stator vanes extending in a radial direction of the axial-flow compressor and rotating around rotary shafts of the variable stator vanes so as to adjust angles of the variable stator vanes; a plurality of rings are connected to the stator vane rows and drive and rotate the variable stator vanes of the stator vane rows that correspond to respective rings; a plurality of levers that correspond to the plurality of rings; a rotary shaft that holds the plurality of levers so as to enable the levers to pivot.

6 Claims, 6 Drawing Sheets

(56) References Cited

U.S. PATENT DOCUMENTS

2006/0263206 A1* 11/2006 Bouru ........................ 415/159
2010/0260591 A1* 10/2010 Martin et al. .................. 415/1
2011/0211941 A1* 9/2011 Hirokawa et al. ............ 415/148

FOREIGN PATENT DOCUMENTS

| JP | 61252899 A | * 11/1986 |
| --- | --- | --- |
| JP | 62-43540 U | 3/1987 |
| JP | 63-151999 U | 10/1988 |
| JP | 4-62399 U | 5/1992 |
| JP | 6-37597 U | 5/1994 |
| JP | 7-91398 A | 4/1995 |
| JP | 2006-322456 A | 11/2006 |
| JP | 2010-196550 A | 9/2010 |

* cited by examiner

AXIAL-FLOW COMPRESSOR AND MODIFICATION METHOD

BACKGROUND OF THE INVENTION

1. Field of the Invention

The present invention relates to an axial-flow compressor that is used for gas turbine or the like and a method for modifying an axial-flow compressor.

2. Description of the Related Art

In recent years, an axial-flow compressor has been modified in many cases so that a pressure ratio of the axial-flow compressor is high in order to improve performance of a gas turbine. Traditionally, variable stator vanes of an axial-flow compressor to be used for a gas turbine or the like have been normally located at a single stage. However, an axial-flow compressor of high pressure ratio has variable stator vanes located at a plurality of stages in general (refer to JP-2006-322456-A and the like).

SUMMARY OF THE INVENTION

Variable stator vanes are driven by a variable stator vane driving device that adjusts angles of the variable stator vanes. In order to modify an axial-flow compressor having variable stator vanes located at a single stage and thereby cause the axial-flow compressor to have variable stator vanes located at a plurality of stages, the efficiency and cost of manufacturing the axial-flow compressor need to be considered and a modification of a variable stator vane driving device needs to be suppressed as much as possible.

It is, therefore, an object of the present invention to provide an axial-flow compressor having variable stator vanes that are located at a plurality of stages and can be easily formed by modifying an axial-flow compressor having variable stator vanes located at a single stage, and a method for modifying the axial-flow compressor having the variable stator vanes located at the single stage.

In order to accomplish the aforementioned object, according to the present invention, an axial-flow compressor includes: stator vane rows that are located at a plurality of stages and include variable stator vanes that rotate around rotary shafts of the variable stator vanes so as to adjust angles of the variable stator vanes, the shafts extending in a radial direction of the axial-flow compressor and; a plurality of rings that are connected to the stator vane rows located at the plurality of stages and drive and rotate the variable stator vanes of the stator vane rows that correspond to the rings, respectively; a plurality of levers that correspond to the plurality of rings, respectively; a rotary shaft that holds the plurality of levers so as to enable the levers to pivot, extends in a direction of extension of an axis of the axial-flow compressor, connects the plurality of levers to each other so that the plurality of levers are fixed to the rotary shaft and integrated with each other through the rotary shaft; a plurality of connecting rods that connect the plurality of rings to the levers that correspond to the rings, respectively; and a cylinder that is connected to a lever that is among the plurality of levers and corresponds to the stator vane row located at the first stage.

According to the present invention, an axial-flow compressor that has variable stator vanes located at a plurality of stages can be easily formed by modifying an axial-flow compressor having variable stator vanes located at a single stage.

DESCRIPTION OF THE PREFERRED EMBODIMENTS

An embodiment of the present invention is described below with reference to the accompanying drawings.

Figure 1:
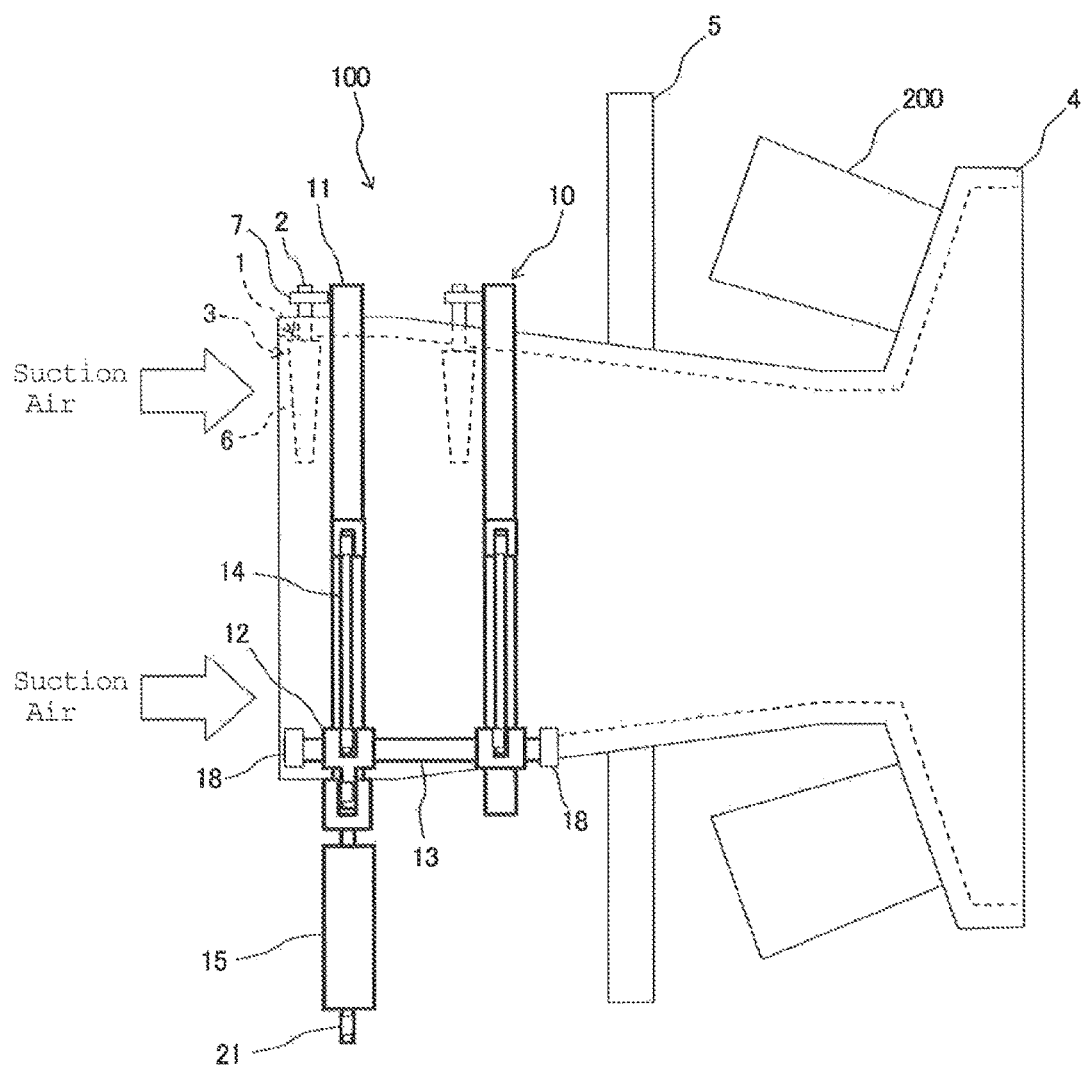
FIG. 1 is a side view of an axial-flow compressor according to an embodiment of the present invention.

FIG. 1 is a side view of an axial-flow compressor 100 according to the embodiment of the present invention.

The axial-flow compressor 100 suctions air and compresses the air. FIG. 1 illustrates an example in which the axial-flow compressor 100 is applied to a gas turbine. Specifically, the air compressed by the axial-flow compressor 100 are combusted with a fuel by a combustor 200 so that the combusted gas causes the gas turbine (not illustrated) to be driven. Rotary power of the gas turbine is treated as a force to drive a loading device such as a power generator, a pump or the like.

The axial-flow compressor 100 according to the present embodiment has a stator vane row located at each of a plurality of stages (only first and second stages are illustrated) and a compressor rotor (not illustrated). The compressor rotor has a blade row (not illustrated) located at each of the plurality of stages on an outer circumferential side of the axial-flow compressor 100. In each of the plurality of stages, the blade row is located on the downstream side of the stator vane row. The stator vane rows and the blade rows that are each located at each of the plurality of stages are constituted by a plurality of vanes (only one stator vane located at the first stage and one stator vane located at the second stage are illustrated) and blades (not illustrated) respectively, each of the vanes and blades radially extending and being arranged in a circular pattern.

In the axial-flow compressor according to the present embodiment, a stator vane row 1 arranged on the upstream side (hereinafter merely referred to as upstream side) of the stages with respect to a flow direction of the suction air, the stages including the first stage, includes variable stator vanes 3 that rotate along rotary shaft 2 of the variable stator vanes 3 in which the angles of the variable stator vanes 3 are adjustable with respect to the flow direction of the suction air, the shaft 2 extending in radial direction of the axial-flow compressor 100. One or more stator vane rows that are each constituted by fixed stator vanes (not illustrated) located at a single or plurality of stages may be arranged on the downstream side (hereinafter merely referred to as downstream side) of the plurality of stator vane rows 1 constituted by the variable stator vanes 3 with respect to the flow direction of the suction air. The stator vane row 1 constituted by the variable stator vanes 3 may be located at all the stages of the axial-flow compressor 100 (that is a case in which fixed stator vanes may not be used). When a stator vane row constituted by fixed stator vanes is provided, the fixed stator vanes each have an end fixed to an inner circumferential surface of a casing 4 and another end facing a shaft of the rotor. The axial-flow compressor 100 includes an extraction pipe 5 located at an intermediate stage. The extraction pipe 5 extracts a part of air that is being compressed for supplying the air to a desired region in the gas turbine as cooling air or sealing air.

The rotary shafts 2 of the variable stator vanes 3 of the stator vane row 1 extend through the casing 4 from profile portions (stator vane portions) 6 that are arranged on the inner side of the casing 4. Levers 7 are fixed to end portions of the rotary shafts 2 that project on an outer circumferential side of the casing 4. The levers 7 fixed to the rotary shafts 2 of the variable stator vanes 3 of the stator vane row 1 are connected to a variable stator vane driving mechanism 10 that simultaneously changes the angles of the variable stator vanes 3.

Figure 2:
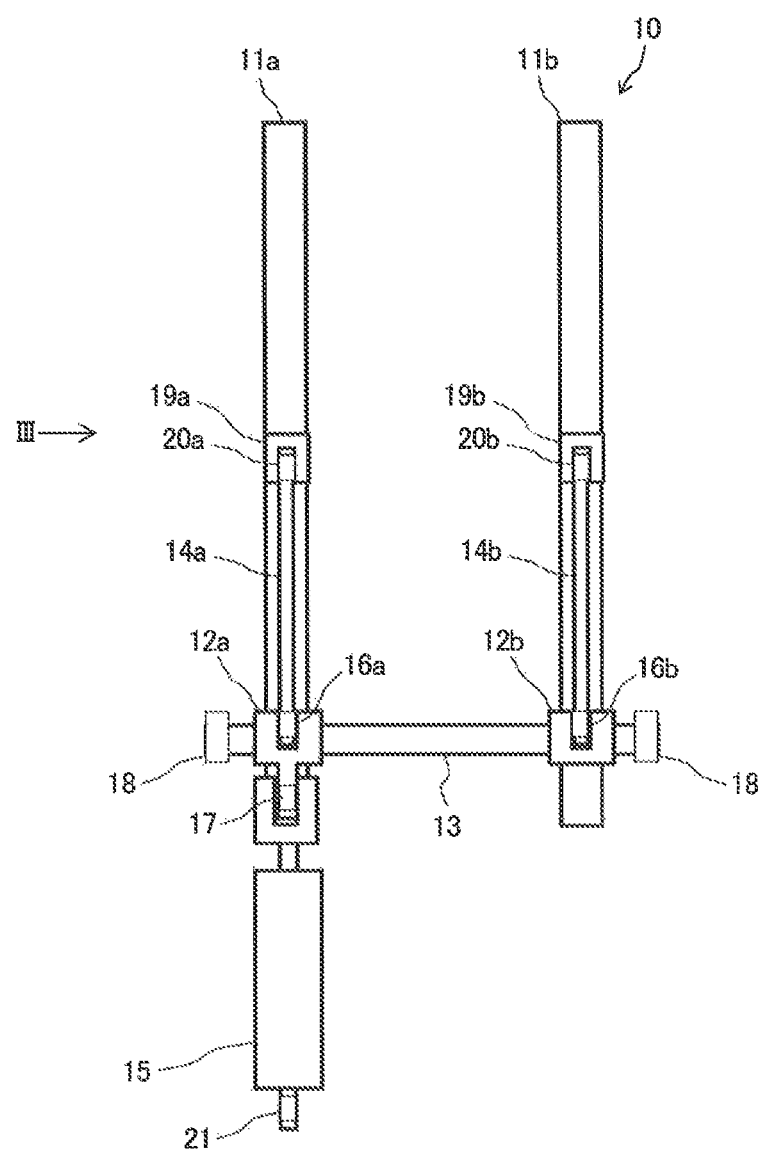
FIG. 2 is a side view of a variable stator vane driving mechanism included in the axial-flow compressor according to the embodiment of the present invention.
Figure 3:
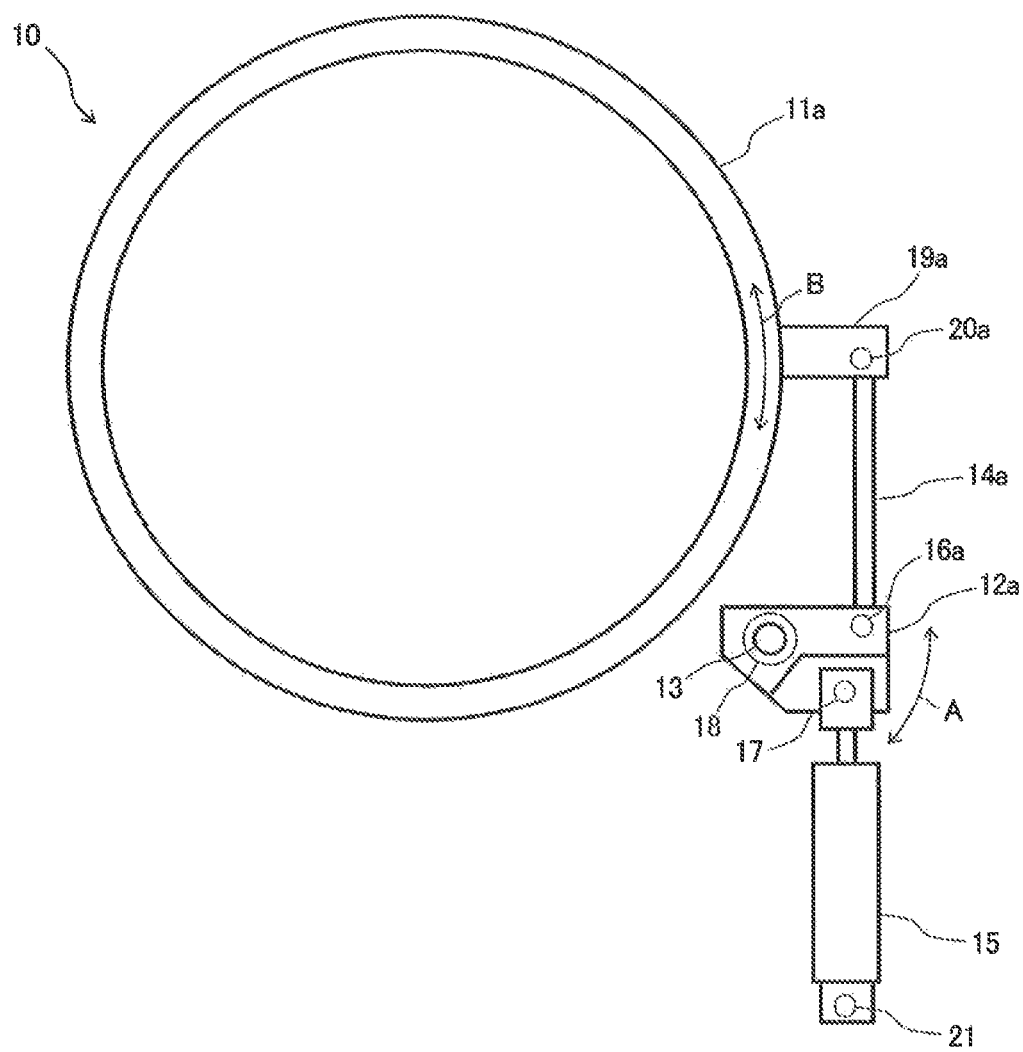
FIG. 3 is a fragmentary front view of the variable stator vane driving mechanism when viewed in a direction indicated by an arrow III illustrated in FIG. 2.

FIG. 2 is a side view of the variable stator vane driving mechanism 10. FIG. 3 is a fragmentary front view of the variable stator vane driving mechanism 10 when viewed in a direction indicated, by an arrow III illustrated in FIG. 2.

As illustrated in FIGS. 2 and 3, the variable stator vane driving mechanism 10 includes a plurality of rings 11, a plurality of levers 12, a rotary shaft 13, a plurality of connecting rods 14 and a cylinder 15. The plurality of rings 11 drive and rotate the variable stator vanes 3 (refer to FIG. 3). The plurality of levers 12 each correspond to each of the plurality of rings 11, respectively. The rotary shaft 13 holds the plurality of levers 12 pivotably. The plurality of connecting rods 14 connect the plurality of rings 11 to the plurality of levers 12 that correspond to the rings 11, respectively. The cylinder 15 is connected to a lever 12 that corresponds to the stator vane row 1 located at the first stage, among the plurality of levers 12. In the present embodiment, the axial-flow compressor 100 includes two stages of the stator vane row 1 constituted by the variable stator vanes 3 as an example. Thus, in the present embodiment, the number of rings 11, the number of levers 12, and the number of connecting rods 14 are each two. Hereinafter, an additional character "a" is added to each of the reference numbers indicating the ring 11, the lever 12 and the connecting rod 14, which are located at the first stage, while an additional character "b" is added to each of the reference numbers indicating the ring 11, the lever 12 and the connecting rod 14, which are located at the second stage.

The ring 11a located at the first stage is connected to the levers 7 (refer to FIG. 1) fixed to the rotary shafts 2 of the variable stator vanes 3 of the stator vane row 1 located at the first stage. Specifically, the levers 7 are pivotably connected to the ring 11a through shafts (not illustrated) that extend in parallel to the rotary shafts 2 of the variable stator vanes 3 corresponding to the levers 7. Similarly, the ring 11b that is located at the second stage is connected to the levers 7 (refer to FIG. 1) fixed to the rotary shafts 2 of the variable stator vanes 3 of the stator vane row 1 located at the second stage so as to allow the levers 7 to pivot. In the present embodiment, three or more rollers that are included in a compressor casing (outer casing) covering an outer circumferential portion of the casing 4 or that are provided in a foundation are in rolling contact with outer circumferential portions of the rings 11a and 11b. The rings 11a and 11b are rotatably held by the rollers in a direction indicated, by an arrow B illustrated in FIG. 3. Manufacturing errors of the rotational centers of the rings 11a and 11b are accepted. However, the rotational centers of the rings 11a and 11b basically match the rotational center of the compressor rotor according to design.

The levers 12a and 12b are connected to the rotary shaft 13 so that the levers 12a and 12b do not rotate relative to the rotary shaft 13. The levers 12a and 12b are integrated with each other through the rotary shaft 13. Thus, the levers 12a and 12b pivot around the rotary shaft 13 in an integrated manner, while the rotary shaft serves as a fulcrum. Spherical bearings 16a and 16b are used in connecting sections in the levers 12a and 12b for connecting the levers to the connecting rods 14a and 14b. A spherical bearing 17 is used in a connecting section in the lever 12a located at the first stage for connecting the lever to the cylinder 15. Specifically, the lever 12a is connected to the connecting rod 14a through the spherical bearing 16a and connected to the cylinder 15 through the spherical bearing 17. The lever 12b is connected to the connecting rod 14b through the spherical bearing 16b.

The rotary shaft 13 extends in an axial direction of the axial-flow compressor and fixedly connects the levers 12a and 12b to each other thereby integrating the levers with each other, as described above. Both ends of the rotary shaft 13 are held by spherical bearings 18 that are held by the compressor casing or the foundation.

One end of the connecting rod 14a is connected to a lever 19a through a spherical bearing 20a, while the lever 19a projects from the outer circumferential portion of the ring 11a. The other end of the connecting rod 14a is connected to the lever 12a through the spherical bearing 16a as described above. One end of the connecting rod 14b is connected to a lever 19b through a spherical bearing 20b, while the lever 19b projects from the outer circumferential portion of the ring 11b. The other end of the connecting rod 14b is connected to the lever 12b through the spherical bearing 16b as described above. In addition, one end of the cylinder 15 is connected to the lever 12a through the spherical bearing 17 as described above. The other end of the cylinder 15 is connected to the compressor casing or the foundation through a spherical bearing 21. When the axial-flow compressor 100 is migrated to a rated operation, the connecting rods 14a and 14b and the cylinder 15 are arranged along a plane that is perpendicular to the axis of the axial-flow compressor 100 as illustrated in FIG. 2, for example. In this case, before the axial-flow compressor 100 starts to operate, the connecting rods 14a and 14b and the cylinder 15 are slightly inclined in the axial direction of the axial-flow compressor 100 so that the connecting rods 14a and 14b and the cylinder 15 extend along the plane that is perpendicular to the axis of the axial-flow compressor 100 when the difference occurs, due to a thermal elongation, between the casing 4 and the compressor casing not illustrated) or the like after the start of the operation of the axial-flow compressor 100. In addition, the arrangement of the spherical bearings 16a, 16b, 17, 20a, 20b and 21, the length of the connecting rods 14a and 14b, the size of the levers 19a, 19b, 12a and 12b and the like are set on the basis of the length and stroke of the cylinder 15 so that the connecting rods 14a and 14b and the cylinder 15 extend along tangential lines of the rings 11a and 11b when the axial-flow compressor 100 is in a state illustrated in FIG. 3 and in a state in which the cylinder 15 is elongated from the state illustrated in FIG. 3. In the present embodiment, the cylinder 15 extends in a vertical direction.

The configuration of the axial-flow compressor 100 according to the present embodiment is suitable for the case in which an existing axial-flow compressor that includes the stator vane row 1 constituted by the plurality of variable stator vanes 3 located at the first stage is used as a foundation and another stator vane row 1 constituted by the plurality of variable stator vanes 3 is easily added to the existing axial-flow compressor so as to improve performance of the existing axial-flow compressor. This modification method is briefly described below.

Figure 6:
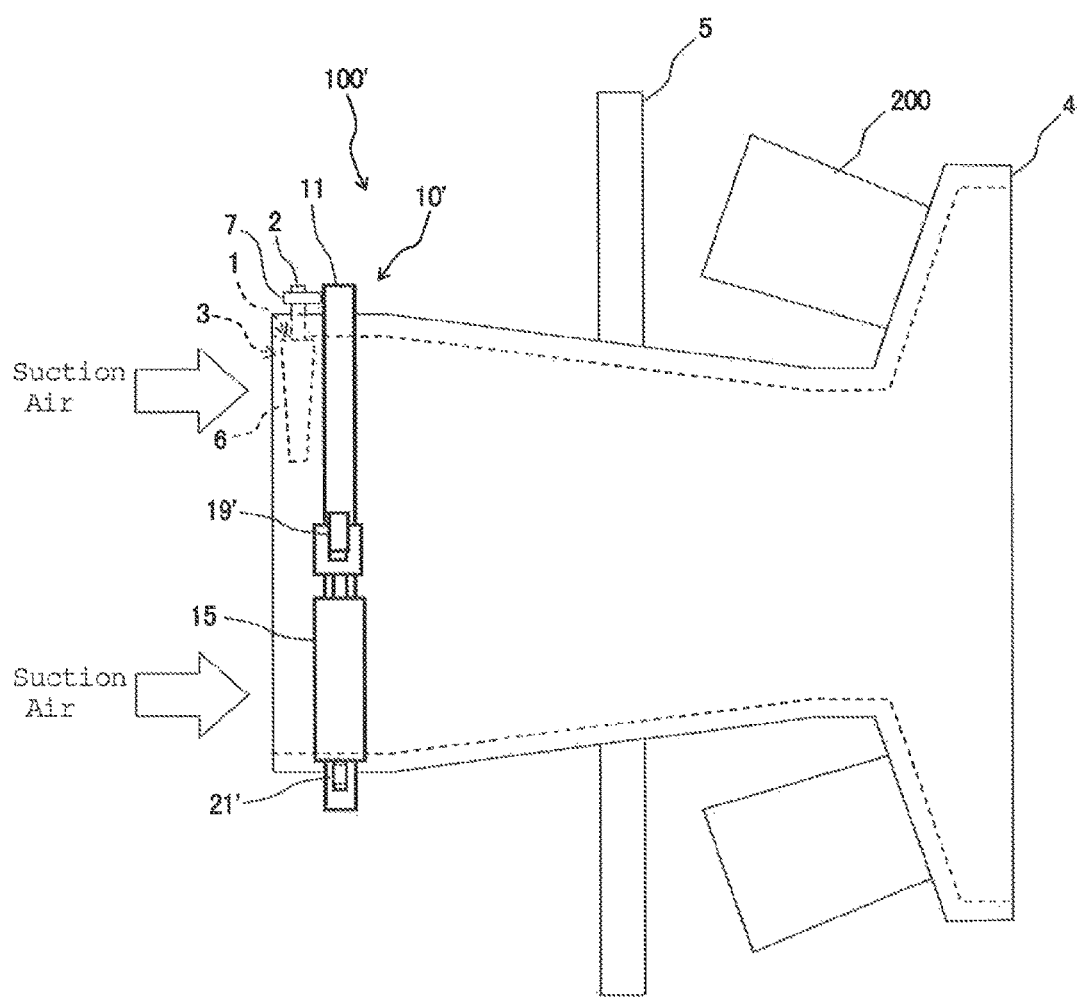
FIG. 6 is a side view of an existing axial-flow compressor having variable stator vanes located at a single stage.
Figure 7:
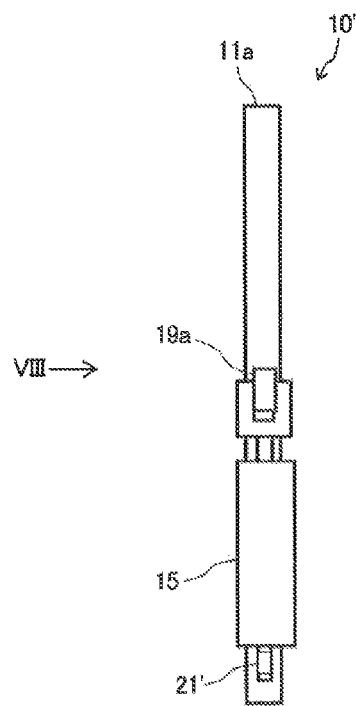
FIG. 7 is a side view of a mechanism for driving the variable stator vanes that are included in the existing axial-flow compressor and located at the single stage.
Figure 8:
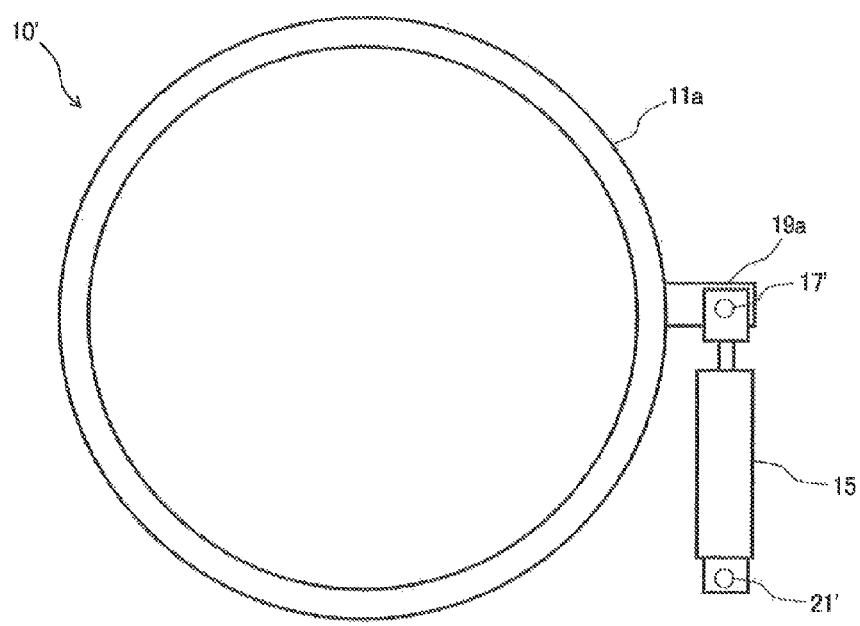
FIG. 8 is a fragmentary front view of the existing axial-flow compressor when viewed in a direction indicated by an arrow VIII illustrated in FIG. 7.

FIG. 6 is a side view of the existing axial-flow compressor that includes variable stator vanes located at the single stage. FIG. 7 is a side view of a variable stator vane driving mechanism that is included in the existing axial-flow compressor and drives the variable stator vanes located at the single stage. FIG. 8 is a fragmentary front view of the variable stator vane driving mechanism when viewed in a direction indicated by an arrow VIII illustrated in FIG. 7. In FIGS. 6 to 8, parts that are the same as illustrated in FIGS. 1 to 3 are indicated by the same reference numerals as illustrated in FIGS. 1 to 3, and a description thereof is omitted.

The existing axial-flow compressor 100' illustrated in FIG. 6 includes a stator vane row 1 that is located at a first stage and constituted by variable stator vanes 3. The existing axial-flow compressor 100 illustrated in FIG. 6 also includes stator vane rows (not illustrated) that are located at a second stage and the later, and constituted by fixed stator vanes. In the existing axial-flow compressor 100', the ring 11a that moves the variable stator vanes 3 located at the first stage is included in an existing variable stator vane driving mechanism 10'.

As illustrated in FIGS. 6 to 8, the existing variable stator vane driving mechanism 10' includes the ring 11a and the cylinder 15 that causes the ring 11a to rotate. One end of the cylinder 15 is connected to the lever 19a through a pin 17' (refer to FIG. 8), while the lever 19a projects from the ring 11a. The other end of the cylinder 15 is connected to the compressor casing or the foundation through a bearing 21'.

In order to modify the existing axial-flow compressor 100' and thereby form the axial-flow compressor 100 illustrated in FIGS. 1 to 3, the fixed stator vanes that are included in the existing axial-flow compressor 100' and located at the second stage (plurality of stages including the second stage when the axial-flow compressor 100 is to be provided with variable stator vanes located at three stages or more) are replaced with new variable stator vanes 3. Then, the stator vane row 1 that is constituted by the new variable stator vanes 3 with which the fixed stator vanes have been replaced, is connected to the rind 11b that drives and rotates the variable stator vanes 3 of the stator vane row 1.

Subsequently, the plurality of levers 12a and 12b, the rotary shaft 13 and the plurality of the connecting rods 14a and 14b are added to the existing axial-flow compressor 100'. In this case, the plurality of levers 12a and 12b correspond to the existing ring 11a located at the first stage and the newly added ring 11b, respectively. The rotary shaft 13 holds the plurality of the levers 12a and 12b pivotably so that the plurality of levers 12a and 12b are integrated with each other. The connecting rod 14a connects the rind 11a to the lever 12a that corresponds to the ring 11a. The connecting rod 14b connects the ring 11b to the lever 12b that corresponds to the ring 11b.

The cylinder 15 (or another cylinder whose class is the same as or similar to the cylinder 15) included in the existing axial-flow compressor 100' is connected to the lever 12a that corresponds to the stator vane row 1 located at the first stage, among the plurality of levers 12a and 12b.

According to the aforementioned procedures, the axial-flow compressor 100 according to the present embodiment can be formed using the existing axial-flow compressor 100' (illustrated in FIGS. 6 to 8) as a foundation.

Next, operations and effects, which are related to changes in the angles of the variable stator vanes 3 of the axial-flow compressor 100 according to the present embodiment, are described.

When the cylinder 15 are elongated and contracted by operating an operating unit (not illustrated), the lever 12a and the lever 12b which is integrated with the lever 12a through the rotary shaft 13 pivot around the rotary shaft 13 in a direction indicated by an arrow A illustrated in FIG. 3. At the same time as the pivoting of the levers 12a and 12b, the rings 11a and 11b that are connected through the levers 12a and 12b and the connecting rods 14a and 14b to the rotary shaft 13 rotate in the direction indicated by the arrow B illustrated in FIG. 3. When the rings 11a and 11b rotate, the levers 7 of the variable stator vanes 3 of the stator vane rows 1 located at the first and second stages are moved by the rotations of the rings 11a and 11b. The variable stator vanes 3 of the stator vane rows 1 located at the first and second stages are driven and rotate around the rotary shafts 2 so that the angles of the variable stator vanes 3 are changed.

According to the present embodiment, the axial-flow compressor 100 that has the variable stator vanes 3 located at a plurality of stages can be formed by using, an the foundation, the existing axial-flow compressor 100' having the stator vane row 1, the ring 11a and the cylinder 15, replacing the fixed stator vanes with the new variable stator vanes 3, and adding the structure having the ring 11b, the levers 12a and 12b and the rotary shaft 13, the spherical bearing 18 holding the structure and the connecting rods 14a and 14b to the existing axial-flow compressor 100'. In this case, among main constituent elements of the existing axial-flow compressor 100', the fixed stator vanes which need to be replaced with the new variable stator vanes 3 and the pin 17' and a pin 21' that hold each ends of the cylinder 15 respectively, are not used for the axial-flow compressor 100. The other main constituent elements that are included in the existing axial-flow compressor 100' can be used for the axial-flow compressor 100. The installation position of the cylinder 15 included in the existing axial-flow compressor 100' is the same as or close to the installation position of the cylinder 15 included in the axial-flow compressor 100.

In the axial-flow compressor 100 that has the plurality or variable stator vanes 3, the variable stator vanes 3 located at the first stage are larger than those located at other stages, and receive the largest force from a fluid. Thus, power necessary to rotate the variable stator vanes 3 located at the first stage is largest. Therefore, power necessary for the variable stator vane driving mechanism 10 to drive the variable stator vanes 3 located at the plurality of stages is mainly determined on the basis of the power that is necessary to rotate the variable stator vanes 3 located at the first stage. Thus, in consideration of the power that is necessary to rotate the variable stator vanes 3 located at the first stage, the cylinder 15 is arranged at a position corresponding to the ring 11a located at the first stage, and output of the cylinder 15 is directly transmitted to the ring 11a located at the first stage, through the connecting rod 14a and the lever 12a.

In addition, the axial-flow compressor 100 is not limited to an axial-flow compressor to be applied to a gas turbine. Normally, the axial-flow compressor has an extraction pipe (extraction pipe 5 in the present embodiment) that is located at an intermediate stage and extracts air from a main flow path in order to suppress an activation load. Thus, if the cylinder is arranged at an intermediate stage, a space between the cylinder 15 and the extraction pipe 5 is not sufficient and a working efficiency is reduced. In the present embodiment, however, the cylinder 15 is arranged at the position corresponding to the ring 11a located at the first stage, and whereby a working space between the cylinder 15 and the extraction pipe 5 is large, and a working efficiency can be ensured.

According to the present embodiment, many structural elements of the existing axial-flow compressor 100' can be used, and whereby a modification of a variable stator vane driving device can be suppressed. Thus, a manufacturing efficiency is high, and the modification can be made with low cost. Therefore, the existing axial-flow compressor 100' that has the variable stator vanes 3 located at the first stage can be easily modified to form the axial-flow compressor 100 that has the variable stator vanes 3 located at a plurality of stages.

A distance between the spherical bearing 16a and the rotary shaft 13 on the lever 12a, and a distance between the spherical bearing 17 and the rotary shaft 13 on the lever 12a, are described below.

Figure 4:
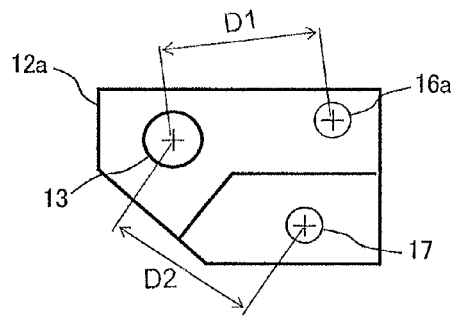
FIG. 4 is a diagram illustrating a model of a lever included in the variable stator vane driving mechanism according to the embodiment of the present invention.
Figure 5:
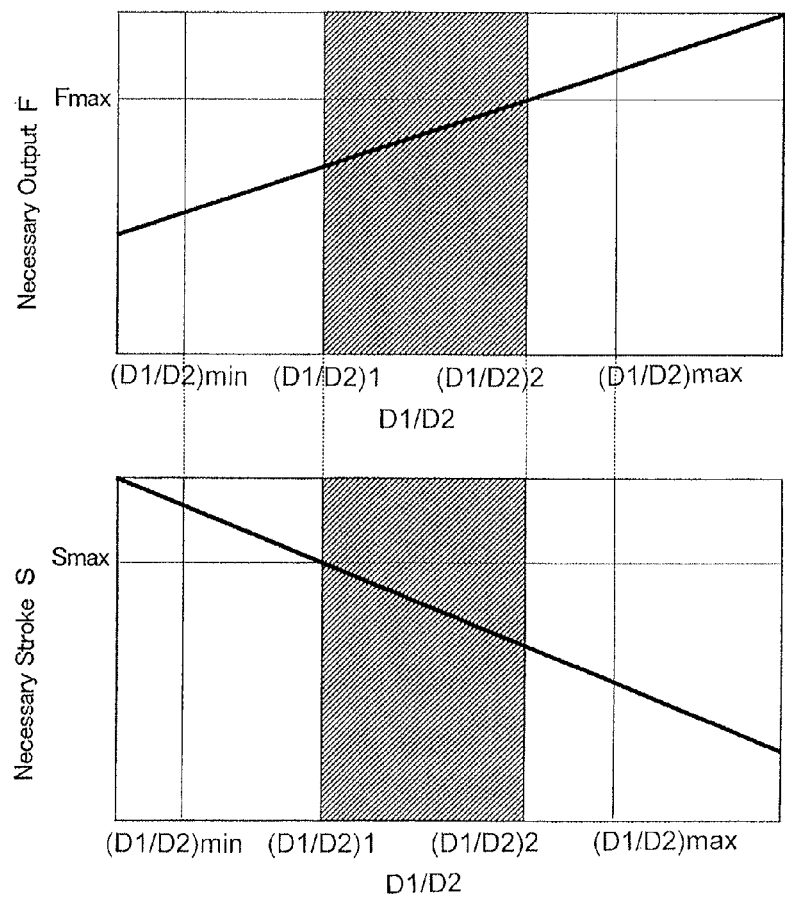
FIG. 5 is a diagram illustrating a relationship between necessary output of a cylinder and the ratio of distances between a rotary shaft and two spherical bearings on the lever included in the variable stator vane driving mechanism according to the embodiment of the present invention, and a relationship between a necessary stroke of the cylinder and the ratio of the distances between the rotary shaft and the two spherical bearings on the lever included in the variable stator vane driving mechanism according to the embodiment of the present invention.

FIG. 4 is a diagram illustrating a model of the lever 12a. FIG. 5 is a diagram illustrating a relationship between necessary output of the cylinder 15 and the ratio of the distance between the spherical bearing 16a and the rotary shaft 13 to the distance between the spherical bearing 17 and the rotary shaft 13, and a relationship between a necessary stroke of the cylinder 15 and the ratio of the distance between the spherical bearing 16a and the rotary shaft 13 to the distance between the spherical bearing 17 and the rotary shaft 13.

As illustrated in FIG. 4, the distance between the center of a section (i.e., the spherical bearing 16a) for connecting the lever 12a to the connecting rod 14a and the center of the rotary shaft 13 is indicated by D1, and the distance between the center of a section (i.e., the spherical bearing 17) for connecting the lever 12a to the cylinder 15 and the center of the rotary shaft 13 is indicated by D2 when viewed in the axial direction of the axial-flow compressor 100. A practical setting range of the ratio D1/D2 is described with the relationship between the ratio D1/D2 and the necessary output F of the cylinder 15 and the relationship between the ratio D1/D2 and the necessary stroke S of the cylinder 15. The minimum ratio D1/D2 and the maximum ratio D1/D2 are values that can be physically set in consideration of a limit of a space between the casing 4 and the compressor casing.

As is apparent from the relationship (illustrated in an upper graph of FIG. 5) between the necessary output F of the cylinder 15 and the ratio D1/D2, the output F of the cylinder 15 necessary to rotate the rings 11a and 11b and thereby drive all the variable stator vanes 3 increases in proportion to an increase in the ratio D1/D2. However, if an existing cylinder is used as the cylinder 15, the maximum output Fmax of the existing cylinder is already determined. Since the variable stator vanes 3 need to be moved by the cylinder 15 whose output is equal to or lower than the maximum output Fmax, the upper limit of the practical setting range of the ratio D1/D2 is a value (D1/D2)2 ((D1/D2)min<(D1/D2)2<(D1/D2)max), based on the upper graph of FIG. 5.

In order to ensure a necessary range of movements (rotational angles) of the variable stator vanes 3, necessary rotational angles of the rings 11a and 11b are determined when the lengths of the existing levers 7 fixed to the rotary shafts 2 of the variable stator vanes 3 located at the first stage are used as a standard. However, as is apparent from the relationship (illustrated in a lower graph of FIG. 5) between the necessary stroke S of the cylinder 15 and the ratio D1/D2, the smaller the ratio D1/D2, the longer the stroke of the cylinder 15 necessary to rotate the rings 11a and 11b at necessary angles. When the existing cylinder is used as the cylinder 15, the maximum stroke Smax of the existing cylinder is already determined. Thus, the cylinder 15 needs to operate with a stroke that is equal to or lower than the maximum stroke Smax of the existing cylinder so that the cylinder 15 causes the rings 11a and 11b to rotate at necessary angles. Thus, based on the lower graph of FIG. 5, the lower limit of the practical setting range of the ratio D1/D2 is a value (D1/D2)1 ((D1/D2)min<(D1/D2)1<(D1/D2)2<(D1/D2)max).

Therefore, when the maximum output Fmax of the existing cylinder 15 is relatively low or when relatively small output of the existing cylinder 15 needs to cause the variable stator vanes 3 to move, it is effective to form the lever 12a so that the distance D1 is small relative to the distance D2 and the ratio D1/D2 is equal to or higher than the minimum ratio (D1/D2)min. On the other hand, when the maximum stroke Smax of the existing cylinder 15 is relatively short or when a relatively short stroke of the existing cylinder 15 needs to cause the variable stator vanes 3 to move, it is effective to form the lever 12a so that the distance D1 is large relative to the distance D2 and the ratio D1/D2 is equal to or lower than the maximum ratio (D1/D2)max. As a preferable example of the distances D1 and D2 to be set, since the first stage are largest in force required to drive the variable stator vanes 3 of which the length is largest among the variable stator vanes, the distances D1 and D2 are equal to or nearly equal to each other so that the output of the cylinder 15 is transferred to the variable stator vanes 3 located at the first stage without loss of the output of the cylinder 15 or almost without loss of the output of the cylinder 15.

As described above, with consideration that the driving force necessary to rotate the variable stator vanes 3 is largest, the lever 12a is formed so that the distances D1 and D2 are equal to or nearly equal to each other, and the output of the cylinder 15 is transferred to the variable stator vanes 3 located at the first stage without loss of the output of the cylinder 15 or almost without loss of the output of the cylinder 15. Thus, the axial-flow compressor 100 according to the present embodiment can be formed, which efficiently uses the existing cylinder 15 and has the variable stator vanes 3 located at a plurality of stages. By improving the efficiency of transferring the driving force in the manner described above, the single cylinder 15 can move the variable stator vanes located at a plurality of stages.

In addition, the cylinder 15 and the connecting rods 14a and 14b operate in a direction that is parallel to or nearly parallel to the tangential line of the ring 11a when viewed in the axial direction of the compressor 100. This configuration is useful to convert the output of the cylinder 15 into forces to drive the rings 11a and 11b.

If normal bearings are used for each of the connecting sections between the ring 11a, the connecting rod 14a, the lever 12a, and the cylinder 15, and each of the connecting sections between the ring 11b, the connecting rod 14b, and the lever 12b, when the positions of the rings 11a and 11b and the position of the cylinder 15 are shifted from the original positions in the direction of the axis of the axial-flow compressor 100 because of the occurrence of the difference, due to a thermal elongation, between the casing 4 and the compressor casing or the like during an operation of the axial-flow compressor 100, the connecting rods 14a and 14b, the rotary shaft 13 and the like are inclined and frictions occur in the connecting sections. This causes the efficiency of transferring the output of the cylinder 15 to be reduced. The rings 11a and 11b and the like are located at a plurality of stages and the number of connecting sections between constituent elements is large. Thus, when the difference between the casing 4 and the compressor casing or the like, due to a thermal elongation, is large, the rings 11a and 11b may not be rotated due to an increase in frictional resistance.

In the present embodiment, the ring 11a and the connecting rod 14a are connected to each other through the spherical bearing 20a; the ring 11b and the connecting rod 14b are connected to each other through the spherical bearing 20b; the connecting rod 14a and the lever 12a are connected to each other through the spherical bearing 16a; the connecting rod 14b and the lever 12b are connected to each other through the spherical bearing 16b; the lever 12a and the cylinder 15 are connected to each other through the spherical bearing 17; and the cylinder 15 is connected to the compressor casing or the foundation through the spherical bearing 21. Thus, loss of the output of the cylinder 15 due to the thermal elongation of the casing 4 or the like can be suppressed. In addition, inoperative states of the rings 11a and 11b can be suppressed.

Before the axial-flow compressor 100 starts to operate, the connecting rods 14a and 14b and the cylinder 15 are inclined with respect to the plane that is perpendicular to the axis of the axial-flow compressor 100. During an operation of the axial-flow compressor 100, the states of the connecting rods 14a and 14b and the state of the cylinder 15 can be migrated to states in which the connecting rods 14a and 14b and the cylinder 15 extend along the plane that is perpendicular to the axis of the axial-flow compressor 100 as illustrated in FIG. 2. This feature is effective to efficiently convert the output of the cylinder 15 into the forces to drive the rings 11a and 11b.

What is claimed is:

1. An axial-flow compressor formed by modifying an existing axial-flow compressor as a base, comprising:
   variable stator vanes used in the existing axial-flow compressor, the variable stator vanes located only at a first stage of a plurality of stages, constituting a stator vane row, and rotating around vane rotary shafts of the variable stator vanes, the vane rotary shafts extending in a radial direction of the existing axial-flow compressor, wherein angles of the variable stator vanes are adjustable;
   other variable stator vanes replace at least fixed stator vanes located at a second stage and later stages in the existing axial-flow compressor;
   a first ring connected to another stator vane row constituted by the other variable stator vanes, the first ring adapted to drive for rotation the other variable stator vanes of the other stator vane row;
   a plurality of levers each operatively associated with the first ring and a second ring located at the first stage;
   a lever rotary shaft that holds the plurality of levers so as to allow the levers to pivot, the lever rotary shaft extending in a direction of extension of an axis of the axial-flow compressor and connecting the plurality of levers to each other so that the plurality of levers are fixed to the lever rotary shaft and integrated with each other through the lever rotary shaft;
   a plurality of connecting rods that connect the plurality of first and second rings to the levers operatively associated with the first and second rings, respectively; and
   an existing cylinder or another cylinder similar to the existing cylinder, incorporated in the existing axial-flow compressor, the existing cylinder or the other cylinder being connected to a lever that is among the plurality of levers and is associated with the stator vane row located at the first stage,
   wherein the existing cylinder or the other cylinder is connected to only one of the plurality of levers, which is associated with the stator vane row located at the first stage, and the one of the plurality levers is connected by the lever rotary shaft to a further lever of the plurality of levers connected to the first ring;
   lengths of the variable stator vanes of the first stage are largest among the variable stator vanes of the plurality of stages;
   the first and second rings and the plurality of connecting rods are connected to each other through spherical bearings, the plurality of connecting rods and the levers are connected to each other through spherical bearings, and the existing cylinder or the other cylinder and the one lever of the plurality of levers located at the first stage are connected to each other through a spherical bearing; and
   the plurality of connecting rods and the existing cylinder or the other cylinder are inclined in the axial direction of the axial-flow compressor so that the plurality of connecting rods and the existing cylinder or the other cylinder are arranged along a plane that is perpendicular to the axis of the axial-flow compressor when the axial-flow compressor is migrated to a rated operation.

2. The axial-flow compressor according to claim 1, wherein at the first stage, a distance between a section for connecting the plurality of levers to the plurality of connecting rods and the lever rotary shaft connected to the plurality of levers matches a distance between a section for connecting the plurality of levers to the existing cylinder or the other cylinder and the lever rotary shaft that is connected to the plurality of levers.

3. The axial-flow compressor according to claim 1, wherein the plurality of connecting rods and the existing cylinder or the other cylinder extend along tangential lines of the first and second rings.

4. A modification method comprising the steps of: using, as a foundation, an existing axial-flow compressor that has variable stator vanes that are located only at a first stage of plurality of stages, constitute a stator vane row with lengths of the variable stator vanes of the first stage being largest among the stator vanes of the plurality of stages, and rotate around rotary shafts of the variable stator vanes so as to adjust angles of the variable stator vanes, the shafts extending in a radial direction of the existing axial-flow compressor, and that has fixed stator vanes that are located at a second stage and later stages;
   replacing at least the fixed stator vanes located at a second stage included in the existing axial-flow compressor with other variable stator vanes;

connecting a new ring to another stator vane row constituted by the other variable stator vanes so that the new ring drives and rotates the other variable stator vanes of the other stator vane row;

adding, to the existing axial-flow compressor, a plurality of levers, a new rotary shaft and a plurality of connecting rods, the plurality of levers corresponding to the new ring and another ring that is located at the first stage, the new rotary shaft holding the plurality of levers so as to enable the plurality of levers to pivot, extending in a direction of extension of an axis of the existing axial-flow compressor, and connecting the plurality of levers to each other so that the plurality of levers are fixed to the new rotary shaft and integrated with each other through the new rotary shaft, the plurality of connecting rods connecting the rings to the plurality of levers that correspond to the rings, respectively;

connecting an existing cylinder or another cylinder similar to the existing cylinder, included in the existing axial-flow compressor to only one lever that is among the plurality of levers, that is connected to a further lever connected to the new ring, and that is associated with the stator vane row located at the first stage;

connecting the rings and the plurality of connecting rods through spherical bearings, connecting the plurality of connecting rods and the plurality of levers through spherical bearings, and connecting the existing cylinder or the other cylinder and the one lever of the plurality of levers located at the first stage through a spherical bearing; and providing the plurality of connecting rods and the existing cylinder or the other cylinder so as to be inclined in the axial direction of the existing axial-flow compressor so that the plurality of connecting rods and the existing cylinder or the other cylinder are arranged along a plane that is perpendicular to the axis of the existing axial-flow compressor when the existing axial-flow compressor is migrated to a rated operation.

5. The axial-flow compressor according to claim 1,
wherein an output force of the existing cylinder or the other cylinder determines an upper limit to a ratio of a distance between a connection of one of the plurality of connecting rods and the lever rotary shaft, and a maximum stroke of the existing cylinder or the other cylinder determines a lower limit to said ratio.

6. The modification method of claim 4, further comprising the steps of:
determining an upper limit to a ratio of a distance between a connection of one of the plurality of connecting rods and the new rotary shaft by way of an output force; and
determining a lower limit to said ratio by way of a maximum stroke of the existing cylinder or the other cylinder.

\* \* \* \* \*